(12) United States Patent
Stablo

(10) Patent No.: US 12,344,177 B2
(45) Date of Patent: Jul. 1, 2025

(54) MULTI-LAYER MOTOR VEHICLE EXTERIOR PART COMPRISING A HEATING ELEMENT

(71) Applicant: OPmobility SE, Lyons (FR)

(72) Inventor: Frédéric Stablo, Sainte-Julie (FR)

(73) Assignee: OPmobility SE, Lyons (FR)

( * ) Notice: Subject to any disclaimer, the term of this patent is extended or adjusted under 35 U.S.C. 154(b) by 1029 days.

(21) Appl. No.: 17/294,306

(22) PCT Filed: Nov. 18, 2019

(86) PCT No.: PCT/EP2019/081569
§ 371 (c)(1),
(2) Date: May 14, 2021

(87) PCT Pub. No.: WO2020/099670
PCT Pub. Date: May 22, 2020

(65) Prior Publication Data
US 2022/0041123 A1 Feb. 10, 2022

(30) Foreign Application Priority Data
Nov. 16, 2018 (FR) .................... 18/71581

(51) Int. Cl.
*B60R 19/03* (2006.01)
*B29C 45/14* (2006.01)
(Continued)

(52) U.S. Cl.
CPC .............. *B60R 19/03* (2013.01); *B32B 27/08* (2013.01); *B32B 27/365* (2013.01); *B32B 27/40* (2013.01);
(Continued)

(58) Field of Classification Search
CPC .......... B29C 45/14549; B29C 45/1671; B29K 2055/02; B29K 2069/00; B29K 2075/00;
(Continued)

(56) References Cited

U.S. PATENT DOCUMENTS 6,415,501 B1\* 7/2002 Schlesselman ........ H05B 3/286
29/610.1
2002/0044101 A1 4/2002 Zimmermann
2007/0290411 A1\* 12/2007 Suter .................... B29C 45/1618
264/510

FOREIGN PATENT DOCUMENTS

DE 10156699 A1 6/2003
EP 1160914 A2 12/2001
(Continued)

OTHER PUBLICATIONS

Seong Ho Jeon, Seong Ho Jeon, Heon Mo Kim, Won Hee Han, and Byoung-Ho Choi, Characterization of an injection-moulded car audio chassis made of polycarbonate-(acrylonitrile-butadiene-styrene)-based composite using metal-coated carbon fibre, Journal of Automobile Engineering vol. 226, Issue 7, Jul. 2012 (Year: 2012).\*

(Continued)

*Primary Examiner* — Chris Q Liu
*Assistant Examiner* — James F Sims, III
(74) *Attorney, Agent, or Firm* — M&B IP Analysts, LLC

(57) ABSTRACT

Motor vehicle exterior part comprising: a wall comprising a face intended to be visible from outside the vehicle, the face being coated with a first layer; a second layer covering the first layer; and a heating element arranged between the two layers on the first layer, the first layer comprising an area of increased thickness and the heating element being arranged only on the area of increased thickness of the first layer.

11 Claims, 2 Drawing Sheets

(51) Int. Cl.
*B29C 45/16* (2006.01)
*B29K 55/02* (2006.01)
*B29K 69/00* (2006.01)
*B29K 75/00* (2006.01)
*B29L 31/30* (2006.01)
*B32B 27/08* (2006.01)
*B32B 27/36* (2006.01)
*B32B 27/40* (2006.01)
*B60R 19/48* (2006.01)
*H05B 3/18* (2006.01)

(52) U.S. Cl.
CPC ............. *B60R 19/483* (2013.01); *H05B 3/18* (2013.01); *B29C 45/14549* (2013.01); *B29C 45/1671* (2013.01); *B29K 2055/02* (2013.01); *B29K 2069/00* (2013.01); *B29K 2075/00* (2013.01); *B29L 2031/3044* (2013.01); *B32B 2605/00* (2013.01); *H05B 2203/017* (2013.01)

(58) Field of Classification Search
CPC ......... B29L 2031/3044; B32B 2605/00; B32B 27/08; B32B 27/365; B32B 27/40; B60R 19/03; B60R 19/483; H01Q 1/02; H01Q 1/3233; H01Q 1/425; H05B 2203/017; H05B 3/18
USPC ........................................................ 219/202
See application file for complete search history.

(56) References Cited

FOREIGN PATENT DOCUMENTS

EP 2741105 A2 6/2014
EP 3252494 A1 12/2017

OTHER PUBLICATIONS

International Search Report of International Searching Authority for PCT/EP2019/081569, ISA/EP, Rijswijk, Netherlands, Dated: Dec. 6, 2019.
Written Opinion of International Search authority for PCT/EP2019/081569, ISA/EP, Rijswijk, Netherlands, Dated: Dec. 13, 2019.

* cited by examiner

[Fig. 1]
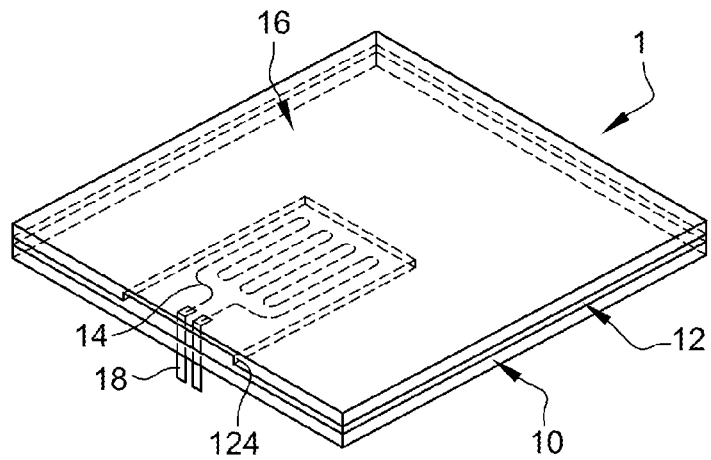
[Fig. 2]
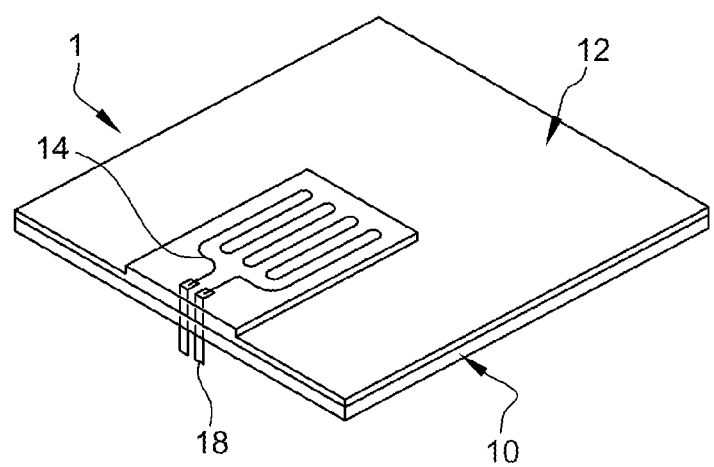

[Fig. 3]
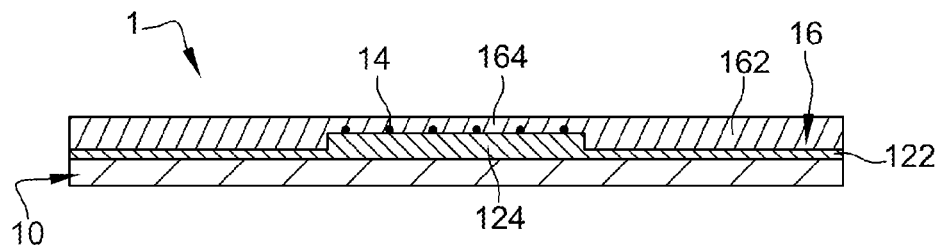
[Fig. 4]
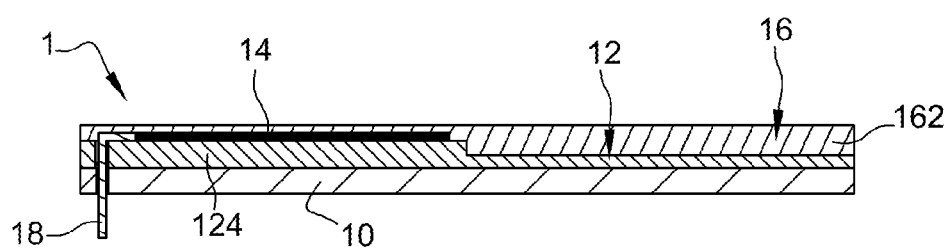

MULTI-LAYER MOTOR VEHICLE EXTERIOR PART COMPRISING A HEATING ELEMENT

CROSS-REFERENCE TO RELATED APPLICATIONS

This application claims priority under 35 U.S.C. § 371 to the International Application No.: PCT/EP2019/081569, filed Nov. 18, 2019, and to the French Patent Application FR18/71581, filed Nov. 16, 2018, the contents of which are hereby incorporated by reference.

The invention relates to an exterior part of a motor vehicle, and in particular a part making it possible to protect a sensor and comprising a de-icing element.

Motor vehicles are increasingly often equipped with exterior sensors making it possible to measure parameters of the outside environment of the vehicle. In particular, many vehicles comprise sensors for driving assistance and/or which are intended to improve driving safety, such as reversing radars, obstacle detection sensors, etc.

Such sensors are often placed in the bumpers or doors of vehicles and are therefore subjected to external aggressions, such as bad weather, dust and impacts, and it is preferable for them to be protected from these external aggressions. Protection can be provided by an element such as a plate or a film placed toward the outside of the vehicle relative to the sensor. Depending on the type of sensors, their operation may be altered by the presence of frost, snow or ice on the exterior face of the sensor protection element. A means of de-icing the element which protects the sensors is then necessary. De-icing is most often done by heating by means of a device transforming electrical energy into thermal energy.

Currently, the exterior vehicle parts which must be able to be heated are, for example, provided with an overmolded heating film. Such a manufacturing method imposes a high workload with many handling steps. In addition, in the event of damage or the formation of wrinkles, a component manufactured in this way can be rendered inoperative and is therefore excluded. Moreover, on exterior parts constructed in this way, the area heated by the overmolding of the film used is often located not on the outer surface of the part, but on the inside, so that the heating efficiency is limited. In addition, the use of heating films generally does not allow any shaping which is optically visible from outside of the area located below or behind the heating film.

The object of the invention is in particular to address the above drawbacks, and to provide a motor vehicle exterior part which is easy, fast and economical to manufacture, allowing easy shaping of the part on its face visible from the exterior, and featuring a very efficient de-icing function.

To this end, one subject matter of the invention is a motor vehicle exterior part comprising:
- a wall comprising a face intended to be visible from outside of a vehicle, said face being coated with a first layer,
- a second layer covering the first layer,
- a heating element arranged between the two layers,
- wherein the first layer comprises an area of increased thickness and the heating element is arranged only on the area of increased thickness of the first layer, and the heating element is a heating filament.

Thus, when the part is installed on the vehicle, the second layer is placed toward the outside of the vehicle, the heating element is located close to the outer surface of the second layer, in particular due to the presence of the area of increased thickness on the first layer making it possible to further reduce the distance between the heating element arranged on this area and the outer surface of the second layer. In addition, since the heating element is a heating filament, the heating element has a small thickness compared to that of the first and second layers, which is advantageous because it makes it possible to limit the total thickness of the exterior part. The term "close to the outer surface" is understood here to mean a distance substantially equal to or less than 0.1 mm from the outer surface. This allows the heating of the outer surface of the exterior part to be efficient, making the de-icing fast and complete, which prevents the sensors from being inoperative for long periods of time, while protecting the heating element from external aggressions.

The term "layer" is understood here to mean a more or less uniform extension of a substance whose thickness is small relative to the surface area.

According to other optional features of the exterior part of a motor vehicle, taken alone or in combination:
- the area of increased thickness of the first layer extends outward from the rest of the first layer. This makes it possible in particular to reduce the distance between the heating element arranged on the area of increased thickness and the outer surface of the second layer.
- an outer face of the second layer, not in contact with the heating element, is substantially planar.
- the layers are substantially transparent to electromagnetic waves at frequencies used by radars. This is more particularly useful if the sensors are of the corresponding type.
- the layers are substantially transparent to electromagnetic waves at frequencies of visible light. This is especially useful if the sensors are lidar. The transparency of the layers also has the advantage that the heating element is visible from outside the vehicle. This is all the more advantageous in the case where the heating element is placed on the area of increased thickness of the first layer because a depth effect is then obtained which gives a person looking at the exterior part the impression that the heating element is not in contact with the part.
- the wall is composed of a mixture of acrylonitrile butadiene styrene polymer and polycarbonate. This material is particularly advantageous for the construction of motor vehicle exterior parts due to its good processability, its high mechanical properties, in particular its impact resistance, and its heat resistance.
- the first and second layers are made of polyurethane. This material is particularly well suited because of its processability and its mechanical properties, as well as some of its physical properties, such as transparency to electromagnetic waves on the frequency bands used by radar sensors.
- the first layer has a thickness of about 3.2 mm in the area of increased thickness and has a thickness of about 2.5 mm in the area outside the area of increased thickness.
- the second layer has a thickness of about 3 mm in its thickest section and 0.7 mm in its thinnest section located opposite the area of increased thickness comprising the heating element.
- the exterior part comprises electrical connection elements of the heating element.

Another subject matter of the invention is a method for manufacturing a motor vehicle exterior part, comprising the following steps in the order of execution a wall comprising a face intended to be visible from outside of the vehicle is produced;

said face is coated with a first layer;

a heating element is deposited;

the first layer and the heating element are coated with a second layer.

This manufacturing method is simple to implement, and comprises a relatively small number of steps, which also allows rapid manufacturing. In addition, this manufacturing method makes it possible to manufacture the heating element independently of the rest of the exterior part, and no longer simultaneously like in the methods of the prior art. This simplifies the implementation and also allows that if necessary, the heating element can be stored before use.

In a preferred embodiment, an area of increased thickness is formed in the first layer and the heating element is deposited on the area of increased thickness.

According to other options of the method for manufacturing a motor vehicle exterior part alone or in combination:

the wall comprising a face intended to be visible from outside of the vehicle is produced by molding of plastic material.

the face intended to be visible from outside of the vehicle is coated with a first layer by injection molding of a polymer or of a mixture of polymers in a mold, a molding chamber of which has a shape allowing the formation of an area of increased thickness in the layer.

the first layer and the heating element are coated with a second layer by injection molding of a polymer or of a mixture of polymers.

the wall intended to be visible from outside of the vehicle is composed of a mixture of acrylonitrile butadiene styrene polymer and polycarbonate.

the polymer or the mixture of polymers injected to form the first layer and the second layer is polyurethane.

BRIEF DESCRIPTION OF THE FIGURES

The invention will be better understood on reading the description which follows, given solely by way of example and with reference to the appended drawings in which:

FIG. 1 is a perspective view of a motor vehicle exterior part according to one embodiment of the invention.

FIG. 2 is a perspective view of the exterior part of FIG. 1 at an intermediate stage of its manufacturing method, i.e., before coating with the second layer.

FIG. 3 is a side section of the exterior part of FIG. 1.

FIG. 4 is a side section of the exterior part of FIG. 1, taken in a section perpendicular to that of FIG. 3.

DETAILED DESCRIPTION

FIGS. 1 to 4 show a motor vehicle exterior part according to a first embodiment, designated by general reference 1.

The motor vehicle exterior part 1 is intended to protect sensors placed in a bumper or in other bodywork elements of a motor vehicle. These sensors can be of any type, and some of them may no longer function in the presence of frost, snow or ice on the exterior part 1, knowing that icing may occur once the outside temperature drops below 10° C., due to the movement speed of the vehicle. It is therefore necessary for the exterior part 1, in addition to its function of protection against external aggressions, to have a de-icing function with respect to the sensor that it protects and which is located on the interior side of the vehicle relative to the exterior part. The motor vehicle exterior part 1 will be described with reference to FIGS. 1 to 4.

The exterior part 1 comprises a wall comprising a face 10 which is intended to be visible from the outside of the vehicle and coated with a first layer 12. The layer 12 at least partially covers said face 10. The first layer 12 is in turn covered with a second layer 16. The exterior part 1 is shown flat in the figures, but it is understood that it can be placed vertically when it is installed on the motor vehicle. Thus, the face 10 is positioned on the interior side of the vehicle, and the second layer 16 is positioned toward the exterior of the vehicle when the exterior part 1 is installed on the vehicle.

A heating element 14 is positioned on the layer 12. The heating element 14 comprises electrical connection parts 18 which are intended to be connected to a power supply. Generally, the heating element 14 converts electrical energy into thermal energy, by the Joule effect. The heating element 14 is thus used to de-ice the exterior part in the portion facing a sensor placed toward the interior of the vehicle relative to the exterior part 1

In an advantageous embodiment, the first layer 12 comprises a so-called area of "increased thickness" 124, which is thicker than the rest of the layer 122. As illustrated in FIG. 3, the heating element 14 is positioned only on the area of increased thickness 124 of the layer 12. In addition, the area of increased thickness 124 extends outwardly from the rest of the first layer 12. In this way, the distance between the area of increased thickness 124, therefore the heating element 14 arranged thereon, and the outer surface of the second layer, is further reduced. In other words, the heating element 14 is close to the outer surface of the layer 16; the term "close" is understood here to mean a distance substantially equal to or less than 0.1 mm from the outer surface of the layer 16.

In one embodiment, the heating element 14 is a heating filament. Such filaments are traditionally used on parts of vehicles which need to be de-iced by heating, such as the rear windows of vehicles or the rearview mirrors, for example. In the case where the sensor located opposite the heating element 14 is a radar sensor or a lidar sensor, the filament is arranged in such a way that it does not disturb the passage of the electromagnetic waves which are necessary for the operation of the sensor.

In another embodiment, the heating element 14 is a heating film. Such heating films are already used in applications for heating and defrosting vehicle parts such as rearview mirrors. In the case where the sensor located opposite the heating element 14 is a radar sensor or a lidar sensor, the heating film is chosen from films not disturbing the passage of the electromagnetic waves which are necessary for the operation of the sensor.

The second layer 16 at least partially covers the first layer 12, at least over the area of increased thickness 124 of the first layer 12. In this way, the second layer 16 also covers the heating element 14. In other words, the heating element 14 is arranged between the first layer 12 and the second layer 16, or is "sandwiched" between the two layers 12 and 16. Thus, the element 14 is protected from external aggressions.

In addition, the heating element 14 is placed only on the area of increased thickness 124. Consequently, when the outer surface of the layer 16 is substantially flat, which is the most frequent case, the thickness of the layer 16 in the portion 164 facing the heating element 14 placed on the area of increased thickness 124 is small, which implies that the heating element is close to the outer surface of the layer 16. This allows the heating of the outer surface of the layer 16 to be more efficient, and therefore the de-icing to be fast and complete. Thus, the sensors placed toward the interior of the vehicle relative to the part 1 can function correctly.

The wall comprising a face 10 may be the outer wall of a bumper or other plastic bodywork element. The wall can also be the outer surface of an element attached to a bumper or of another bodywork element.

In a preferred embodiment, the first layer 12 has a thickness of about 3.2 mm in the area of increased thickness 124 and has a thickness of about 2.5 mm in the portion 122 outside of the area of increased thickness.

In a preferred embodiment, the second layer 16 has a thickness of about 3 mm in its thickest section 162 and has a thickness of about 0.7 mm in its thinnest section 164 located opposite the area of increased thickness 124 comprising the heating element 14.

Advantageously, the heating element 14 has a small thickness compared to the thicknesses of the layers 12 and 16. This makes it possible in particular to limit the total thickness of the exterior part 1, which is preferable for reasons of esthetics and weight.

Advantageously, but non-limitingly, the surface 10 is composed of a polymer material consisting of a mixture of Acrylonitrile Butadiene Styrene polymer and of polycarbonate, and often referred to as ABS-PC. Such a material indeed has characteristics that are well suited to the manufacture of motor vehicle exterior parts, and in particular good transformability or processability, good impact resistance, and good heat resistance, as well as good performance over time.

Advantageously, the first and the second layer 12, 16 are composed of polyurethane. Polyurethane is suitable because it has good transformability or processability and good mechanical properties, and it is further transparent to electromagnetic waves in the frequencies used by radar sensors. On the other hand, polyurethane has good adhesion capacity on ABS/PC, which is an additional advantage.

Additionally, polyurethane can also be transparent to visible light, which is useful if the sensors are lidar-type sensors. The transparency of the layers 12, 16 to visible light further has the advantage that the heating element 14 is visible from outside of the vehicle. This is all the more advantageous in the case where the heating element 14 is placed on the area of increased thickness 124 of the first layer 12 because a depth effect is then obtained which gives a person looking at the exterior part the impression that the heating element is not in contact with the part, or is not part of this part, which is aesthetically appealing.

It is understood that the polymer materials mentioned above are illustrative and non-limiting, and that other materials may be suitable.

The motor vehicle exterior part 1 can be manufactured according to the following method:
 a wall comprising a face 10 which is intended to be visible from the outside of the vehicle is produced,
 said face 10 is coated with a first layer 12,
 a heating element 14 is deposited on the layer 12,
 the first layer 12 and the heating element 14 are coated with a second layer 16.

Preferably, the layers 12 and 16 are formed by injection molding.

Preferably, an area of increased thickness 124 is formed on the layer 12 and the heating element 14 is deposited on this area of increased thickness. If the layer 12 is formed by injection molding, the molding chamber has a shape so as to allow the formation of an area of increased thickness 124 in the layer 12.

Advantageously, in this method, the wall comprising a face 10 is composed of ABS-PC (mixture of acrylonitrile butadiene styrene and polycarbonate), and the first layer 12 and second layer 16 are composed of polyurethane.

This manufacturing method is simple to implement, and comprises a relatively small number of steps, which also allows rapid manufacturing. In particular, the heating element 14 is simply deposited on the area of increased thickness 124 of the first layer 12, and is then held in place by the overmolding of the second layer 16.

The invention claimed is:

1. A method of manufacturing an exterior part, comprising the following steps executed sequentially:
 producing a wall comprising a face;
 coating said face with a first layer;
 forming an area of increased thickness in the first layer;
 depositing a heating element only on the area of increased thickness in the first layer; and
 coating the first layer and the heating element with a second layer,
 wherein the exterior part includes the wall, wherein the face of the wall is intended to be visible from outside of a vehicle, wherein the exterior part further includes the second layer covering the first layer, wherein the exterior part further includes the heating element arranged between the first layer and the second layer, wherein the heating element is arranged only on the area of increased thickness of the first layer, wherein the heating element is a heating filament.

2. The method according to claim 1, wherein the wall comprising the face is produced by molding of a plastic material.

3. The method according to claim 1, wherein the wall comprising the face is coated with the first layer by injection molding of a polymer or of a mixture of polymers in a mold, wherein a molding chamber for the injection molding has a shape adapted for formation of the area of increased thickness in the first layer.

4. The method according to claim 1, wherein the first layer and the heating element are coated with the second layer by injection molding of a polymer or a mixture of polymers.

5. The method according to claim 1, wherein the wall comprising the face is composed of a mixture of acrylonitrile butadiene styrene polymer and polycarbonate.

6. The method according to claim 3, wherein the polymer or the mixture of polymers injected to form the first layer is polyurethane.

7. The method according to claim 4, wherein the polymer or the mixture of polymers injected to form the second layer is polyurethane.

8. The method according to claim 1, wherein the area of increased thickness in the first layer extends outward from a rest of the first layer.

9. The method according to claim 1, wherein an exterior face of the second layer, not in contact with the heating element, is substantially planar.

10. The method according to claim 1, wherein the first layer and the second layer are substantially transparent to electromagnetic waves at frequencies used by radars.

11. The method according to claim 1, wherein the first layer and the second layer are substantially transparent to electromagnetic waves at frequencies of visible light.

\* \* \* \* \*